(12) United States Patent
Fogwill et al.

(10) Patent No.: US 10,823,712 B2
(45) Date of Patent: Nov. 3, 2020

(54) MODIFIER STREAM ELUTION OF TRAP COLUMN FOR MULTIDIMENSIONAL COMPRESSIBLE FLUID-BASED CHROMATOGRAPHY

(71) Applicant: Waters Technologies Corporation, Milford, MA (US)

(72) Inventors: Michael O. Fogwill, South Grafton, MA (US); Isabelle François, Sint-Lievens-Houtem (BE)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 128 days.

(21) Appl. No.: 15/850,146

(22) Filed: Dec. 21, 2017

(65) Prior Publication Data

US 2018/0196019 A1    Jul. 12, 2018

Related U.S. Application Data

(60) Provisional application No. 62/443,284, filed on Jan. 6, 2017.

(51) Int. Cl.
*G01N 30/26* (2006.01)
*G01N 30/60* (2006.01)
(Continued)

(52) U.S. Cl.
CPC .......... *G01N 30/26* (2013.01); *G01N 30/463* (2013.01); *G01N 30/60* (2013.01); *G01N 30/20* (2013.01);
(Continued)

(58) Field of Classification Search
CPC .... G01N 30/26; G01N 30/462; G01N 30/463; B01D 15/40
See application file for complete search history.

(56) References Cited

U.S. PATENT DOCUMENTS

| 3,504,799 A | 4/1970 | Ogle |
|---|---|---|
| 4,836,038 A | 6/1989 | Baldwyn |
| (Continued) | | |

FOREIGN PATENT DOCUMENTS

| EP | 2414823 B1 | 8/2016 |
|---|---|---|
| WO | 2002050531 A2 | 6/2002 |
| (Continued) | | |

OTHER PUBLICATIONS

International Preliminary Report on Patentability in PCT/US2017/067820 dated Jul. 18, 2019; 7 pages.
(Continued)

*Primary Examiner* — John Fitzgerald
(74) *Attorney, Agent, or Firm* — Schmeiser, Olsen & Watts LLP; William G. Guerin

(57) ABSTRACT

A method of performing a chromatographic separation includes modulating a portion of a flowstream to a trap column to retain at least one analyte from the flowstream on the trap column. A flow of a modifier is provided through the trap column to generate an elution comprising the at least one analyte. A flow of a compressible fluid-based chromatography (CFC) mobile phase or CFC solvent is merged with the elution from the trap column to generate a diluted elution. Carbon dioxide may be used as the CFC solvent or as a component of the CFC mobile phase. The diluted elution is provided to a CFC column where at least one analyte is focused at a head of the CFC column. Examples of a flowstream that may be used include an eluent from a chromatography column or a fluid flow from an extraction system.

6 Claims, 10 Drawing Sheets

(51) Int. Cl.
*G01N 30/46* (2006.01)
*G01N 30/34* (2006.01)
*G01N 30/20* (2006.01)

(52) U.S. Cl.
CPC .......... *G01N 30/34* (2013.01); *G01N 30/462* (2013.01); *G01N 30/465* (2013.01)

(56) References Cited

U.S. PATENT DOCUMENTS

| | | | |
|---|---|---|---|
| 5,234,599 A | 8/1993 | Cortes et al. | |
| 5,458,783 A * | 10/1995 | Levy | G01N 30/28 |
| | | | 210/198.2 |
| 6,428,702 B1 * | 8/2002 | Berger | B01D 15/14 |
| | | | 210/136 |
| 6,576,125 B2 | 6/2003 | Berger et al. | |
| 6,790,361 B2 | 9/2004 | Wheat et al. | |
| 8,613,216 B2 * | 12/2013 | Vorm | G01N 30/08 |
| | | | 73/61.53 |
| 8,621,915 B2 * | 1/2014 | Liu | G01N 30/463 |
| | | | 210/656 |
| 8,642,351 B2 * | 2/2014 | Liu | G01N 30/34 |
| | | | 210/198.2 |
| 9,897,580 B2 * | 2/2018 | Yamaguchi | G01N 30/463 |
| 10,478,749 B2 * | 11/2019 | Wikfors | G01N 30/20 |
| 2002/0011437 A1 | 1/2002 | Kaito et al. | |
| 2006/0054543 A1 | 3/2006 | Petro et al. | |
| 2007/0295664 A1 * | 12/2007 | Glatz | G01N 30/462 |
| | | | 210/656 |
| 2008/0229810 A1 * | 9/2008 | Swart | G01N 30/20 |
| | | | 73/61.55 |
| 2009/0205409 A1 * | 8/2009 | Ciavarini | G01N 30/34 |
| | | | 73/61.56 |
| 2010/0107742 A1 * | 5/2010 | Liu | G01N 30/34 |
| | | | 73/61.56 |
| 2010/0258487 A1 * | 10/2010 | Zelechonok | G01N 30/40 |
| | | | 210/108 |
| 2011/0247403 A1 * | 10/2011 | Liu | G01N 30/463 |
| | | | 73/61.55 |
| 2011/0252873 A1 * | 10/2011 | Vorm | G01N 30/08 |
| | | | 73/61.53 |
| 2012/0262178 A1 * | 10/2012 | Dourdeville | G01N 24/08 |
| | | | 324/321 |
| 2013/0340508 A1 * | 12/2013 | Osaka | G01N 30/468 |
| | | | 73/61.53 |
| 2014/0014585 A1 * | 1/2014 | Dourdeville | G01N 30/04 |
| | | | 210/656 |
| 2014/0299765 A1 | 10/2014 | Di Bussolo et al. | |
| 2015/0034812 A1 * | 2/2015 | Yamaguchi | G01N 30/463 |
| | | | 250/281 |
| 2015/0346168 A1 * | 12/2015 | Ciavarini | G01N 30/32 |
| | | | 73/61.56 |
| 2015/0377843 A1 | 12/2015 | Morikawa et al. | |
| 2017/0100682 A1 * | 4/2017 | Wikfors | G01N 30/34 |
| 2017/0209811 A1 * | 7/2017 | Dlugasch | B01D 15/1878 |
| 2017/0209812 A1 * | 7/2017 | Dlugasch | B01D 15/1878 |
| 2018/0153948 A1 * | 6/2018 | Murphy | B01D 11/0288 |

FOREIGN PATENT DOCUMENTS

| | | |
|---|---|---|
| WO | 2014132687 A1 | 9/2014 |
| WO | 2015183290 A1 | 12/2015 |

OTHER PUBLICATIONS

International Search Report and Written Opinion in counterpart International Patent Application No. PCT/US17/67820, dated Mar. 26, 2018; 15 pages.
Francois, I., et al., "Construction of a New Interface for Comprehensive Supercritical Fluid Chromatography x Reversed Phase Liquid Chromatography (SFC x RPLC)," in Journal of Separation Science, vol. 31, pp. 3473-3478, Jun. 2008.
Francois, I., et al., "Comprehensive Supercritical Fluid Chromatography x Reversed Phase Liquid Chromatography for the Analysis of the Fatty Acids in Fish Oil," in Journal of Chromatography A, vol. 1216, pp. 4005-4012, Mar. 2009.
Francois, I., et al., "Considerations on Comprehensive and Off-Line Supercritical Fluid Chromatography x Reversed-Phase Liquid Chromatography for the Analysis of Triacylglycerols in Fish Oil," in Journal of Separation Science, vol. 33, pp. 1504-1512, Feb. 2010.
Rajendran, A., "Design of Preparative-Supercritical Fluid Chromatography," in Journal of Chromatography A, vol. 1250, pp. 227-249, May 2012.
Mishra, M., et al., "Influence of a Strong Sample Solvent on Analyte Dispersion in Chromatographic Columns," in Journal of Chromatography A, vol. 1297, pp. 46-55, Apr. 2013.
International Search Report and Written Opinion in International Patent Application No. PCT/US2016/057612, dated May 22, 2017; 9 pages.

* cited by examiner

MODIFIER STREAM ELUTION OF TRAP COLUMN FOR MULTIDIMENSIONAL COMPRESSIBLE FLUID-BASED CHROMATOGRAPHY

RELATED APPLICATION

This application claims the benefit of the earlier filing date of U.S. Provisional Patent Application No. 62/443,284, filed Jan. 6, 2017 and titled "Modifier Stream Elution of Trap Column for Multidimensional Compressible Fluid-Based Chromatography," the entirety of which is incorporated herein by reference.

FIELD OF THE INVENTION

The invention relates generally to multidimensional chromatography. More particularly, the invention relates to multidimensional chromatography performed with highly compressible fluids, such as supercritical or near-supercritical fluids.

BACKGROUND

Multidimensional chromatography requires a portion of a primary separation mobile phase to be introduced, or "modulated," onto a second separation dimension. The modulation interface should provide for sharp peaks on the secondary separation dimension. In gas chromatography, modulation can be very efficient through thermal manipulation of the secondary dimension. In reversed phase liquid chromatography, modulation can be performed with a trap column placed between the primary and secondary analytical columns. The trap column often has different retentivity than the secondary analytical column. For example, a C8 trap column may be used for modulation while a C18 analytical column may be used for the secondary separation. Often there is no similar pairing of stationary phase materials available for near-supercritical and supercritical fluid chromatography systems, such as a carbon dioxide-based chromatography system.

Focusing an analyte of interest onto an analytical column after elution from a trap column can be challenging. Such refocusing in a near-supercritical or supercritical fluid chromatography system can be particularly challenging due to the high diffusivity of analytes in the mobile phase flow. A mobile phase that has sufficient solvating strength to elute the analytes from the trap column may be too strong to enable proper retention and refocusing of the analytes on the secondary dimension analytical column. The result can be a chromatogram with peaks exhibiting breakthrough peak profiles.

SUMMARY

In one aspect, the invention features a method forperforming a chromatographic separation. The method includes modulating a portion of a flowstream to a trap column to thereby retain at least one analyte from the flowstream on the trap column. A flow of a modifier is provided through the trap column to thereby generate an elution comprising the at least one analyte. A flow of a compressible fluid based chromatography (CFC) solvent is merged with the elution from the trap column to generate a diluted elution and the diluted elution is provided to a CFC column wherein the at least one analyte is focused at a head of the CFC column.

In another aspect, the invention features a system for performing a chromatographic separation. The system includes a trap column having a trap inlet and a trap outlet, a source of a CFC modifier and a source of a CFC solvent. The system also includes a valve having a first valve inlet to receive a flowstream, a second valve inlet in communication with the source of the CFC modifier and a valve outlet in communication with the trap outlet. The valve is configurable in at least a first state in which the flowstream flows to the trap inlet so that at least one analyte from the flowstream is retained on the trap column and a second state in which the CFC modifier flows to the trap inlet to thereby elute the at least one analyte from the trap column in a trap elution at the valve outlet. The system further includes a flow combiner having a first combiner inlet in communication with the valve outlet to receive the trap elution, a second combiner inlet to receive a flow of the CFC solvent and a combiner outlet to provide a diluted trap elution.

In another aspect, the invention features a system for performing a chromatographic separation. The system includes a trap column having a trap inlet and a trap outlet, a source of a reverse phase solvent, a source of a CFC mobile phase and a valve. The valve has a first valve inlet to receive a flowstream, a second valve inlet in communication with the source of the reverse phase solvent and a valve outlet in communication with the trap outlet. The valve is configurable in at least a first state in which the flowstream flows to the trap inlet so that at least one analyte in the flowstream is retained on the trap column and a second state in which the reverse phase solvent flows to the trap inlet to thereby elute the at least one analyte from the trap column in a trap elution at the valve outlet. The system further includes a flow combiner having a first combiner inlet in communication with the valve outlet to receive the trap elution, a second combiner inlet to receive a flow of the CFC mobile phase and a combiner outlet to provide a merged flow of the trap elution and the CFC mobile phase.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

Figure 1:
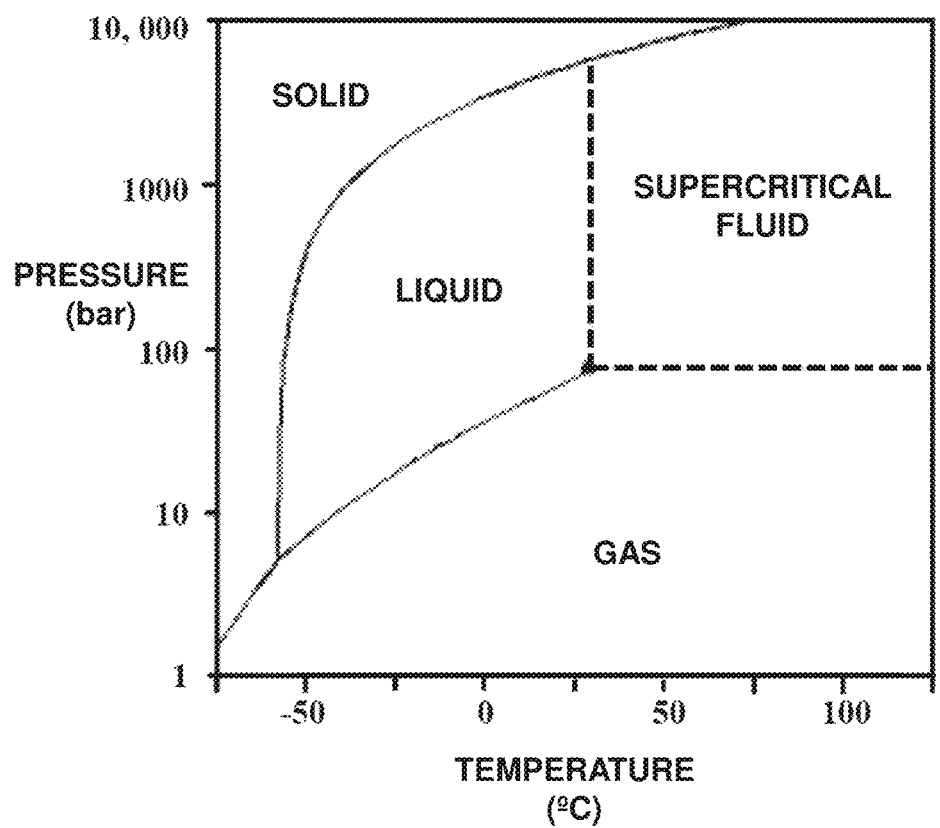
FIG. 1 is a graphical depiction of the solid, liquid, gas and supercritical states of carbon dioxide as a function of temperature and pressure.

Supercritical fluid chromatography (SFC) is a chromatographic technique that uses a supercritical fluid or near supercritical fluid as the mobile phase. For various liquid substances there is a temperature above which the substance cannot exist as a liquid regardless of increasing pressure. Similarly, there is a pressure above which the substance cannot exist as a gas regardless of increasing temperature. These levels are the critical temperature and critical pressure of the substance, and define boundaries on a phase diagram for the substance. For example, FIG. 1 graphically shows the solid, liquid, gas and supercritical states for carbon dioxide. At these levels, the liquid and vapor have the same density and the fluid cannot be liquefied by increasing the pressure. At greater temperature or pressure there is no phase change and the substance acts as a supercritical fluid. Thus, a supercritical fluid can be described as a fluid obtained by heating to a temperature greater than the critical temperature and compressing to greater than the critical pressure. There is a continuous transition from liquid to supercritical fluid by increasing temperature at constant pressure or from gas to supercritical fluid by increasing pressure at constant temperature.

As used herein, the phrase "compressible fluid-based chromatography" ("CFC") includes chromatography techniques using highly compressible fluids, such as supercritical fluids and fluids having temperatures and/or pressures near the boundaries defining the supercritical state for the fluid (i.e., "near-supercritical" fluids). Thus the mobile phase, and optionally one or more co-solvent fluids, in a CFC system may be in a gaseous state at ambient or room temperature and pressure, and may be in a liquid, near-supercritical, or supercritical state in at least one location within the system. For example, the mobile phase may be in a supercritical or near-supercritical state at the column. In one example, if the fluid is pure carbon dioxide, the fluid may be in a supercritical state somewhere in the chromatography system; however, as a modifier such as methanol is added to the carbon dioxide, the solvent mixture may be liquid at some times and at one or more locations in the system. Thus it will be understood that a fluid which is supercritical while flowing through the chromatographic column may be liquid or gaseous at other locations in the CFC system. Moreover, the fluid state may change as the relative amount of modifier changes according to a gradient composition.

Carbon dioxide-based CFC systems have the advantage of being inexpensive, eco-friendly and non-toxic. The carbon dioxide-based mobile phase, with or without modifiers, generally has a higher greater diffusion and lower viscosity relative to conventional liquid solvents. The low viscosity results in a lower pressure drop across the column when compared to a typical liquid solvent at a similar flow rate. The greater diffusion results in increased mass transfer resulting in high chromatographic efficiency at high mobile phase flow rates.

As used herein, a "flowstream" refers to any flow of a fluid within a channel or conduit, such as a fluid flow within tubing. By way of non-limiting examples, a flowstream may be an eluent from a chromatography column or a fluid flow from an extraction system such as a pressurized liquid extraction system. The flowstream may include analytes or compounds to be detected and/or collected by a system receiving the flowstream.

Figure 2A:
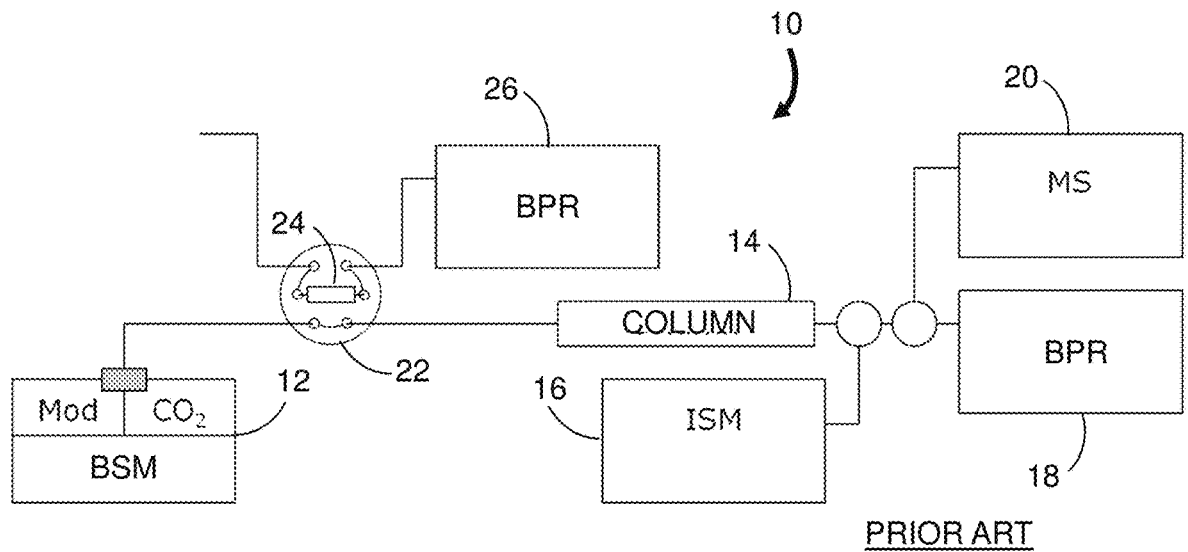
FIG. 2A is a block diagram of a carbon dioxide-based CFC system for performing a chromatographic separation and having a valve configured in a first state.

Referring to the block diagram of FIG. 2A, a carbon dioxide-based CFC system 10 for performing a chromatographic separation is shown. The system 10 includes a mobile phase pump 12, a chromatographic column 14 for performing the chromatographic separation, a makeup pump 16, a back pressure regulator 18 and a mass spectrometer 20. The mobile phase pump 12 includes a source of a modifier and a source of a mobile phase solvent. The system 10 further includes a valve 22 disposed in the fluidic path between the mobile phase pump 12 and the column 14, a trap column 24 having a trap inlet and a trap outlet each in fluidic communication with one of the valve ports of the valve 22, and a second back pressure regulator 26.

The trap column 24 generally includes a stationary phase that is different from the stationary phase of the chromatographic column although this is not a requirement. The valve 22 is configured to receive at least a portion of a flowstream from a primary chromatography system (e.g., the eluent of the primary chromatographic system) or a flowstream from an extraction system (e.g., a pressurized liquid extraction system). The primary chromatography system may be another CFC system such as another carbon dioxide-based system. Alternatively, the primary chromatography system may be a liquid chromatography system. A modulator, such as a rotary shear seal valve, (not shown) is used to modulate a portion of an eluent from the primary chromatography system into a flow path 28 to the valve 22.

When the valve 22 is in a first state as shown in the figure, the received portion of the eluent flows through the trap column 24 where one or more analytes are retained while a mobile phase from the mobile phase pump 12 flows through the valve 22 and the chromatographic column 14. The mobile phase includes carbon dioxide and may be combined with an organic liquid modifier to form a binary gradient mobile phase.

Figure 2B:
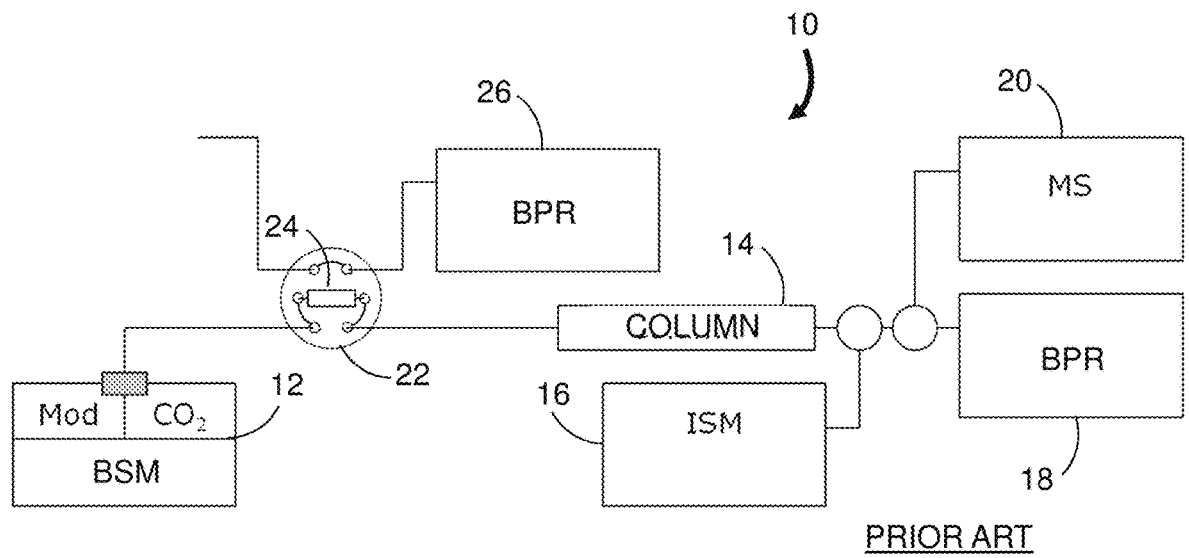
FIG. 2B is a block diagram of the carbon dioxide-based CFC system of FIG. 2A with the valve configured in a second state.

Once the analytes in the portion of the eluent from the primary chromatography system are retained on the trap column 24, the valve 22 is switched to a second state, as shown in FIG. 2B, so that the mobile phase flow comprised of carbon dioxide and modifier is directed through the trap column 24. The mobile phase is of sufficient solvating strength to elute analytes from the trap column 24 into a flow to the chromatographic column 14. Generally, the solvating strength of the mobile phase used for trap elution prevents proper retention of the analytes at the head of the column 14. As a result, the peaks in the chromatogram exhibit a breakthrough peak profile.

In an experimental evaluation, a 100 µL injection of an approximate 0.01 µg/mL solution of four components: tolbutamide, ketoprofen, reserpine and ranitidine was loaded onto a 2.1×30 mm, 5 µm C8 HPLC guard column (trap column 24). This large volume injection was used in place of the primary chromatographic system or an extraction system. A 1.0 mL/min flow of 95:5 carbon dioxide:isopropanol was used to load the injection onto the trap column. The BPR 26 was set to maintain the loading solvent at a pressure of 2,000 psi (13.8 MPa). The trap column was loaded for approximately 30 seconds in the load configuration shown in FIG. 2A before switching the valve 22 to obtain the configuration shown in FIG. 2B and subsequently eluting the trap at 1.5 mL/min with a 2%-50% methanol gradient over 3 minutes. The chromatographic column 14 was a 3×100 mm 1.7 um BEH silica column maintained at 40° C. The BPR 18 was set to maintain the chromatographic flow at a pressure of 2,000 psi (13.8 MPa). A makeup flow of 300 µL/min of 95:5:0.2 methanol:water:$NH_4OH$ was added post column to aid in mass spectrometer ionization.

Figure 3:
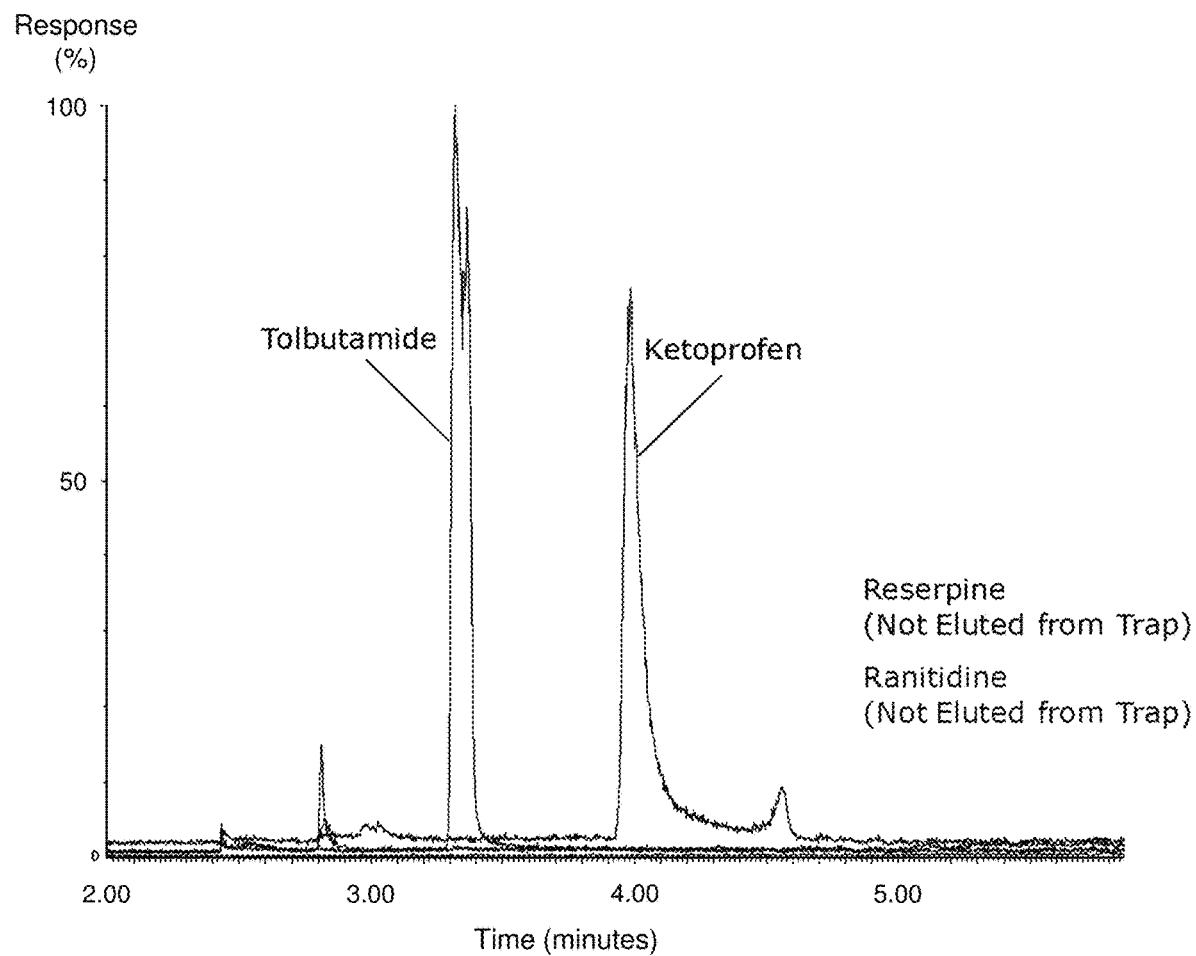
FIG. 3 is an example of a chromatogram for a secondary chromatography system exhibiting breakthrough peak profiles.

FIG. 3 shows the secondary dimension chromatogram eluted under mixed-stream trap elution. The poor peak shape of ketoprofen is indicative of poor focusing on the secondary dimension chromatographic column. In this evaluation, the secondary dimension mobile phase was strong enough to elute the analyte from the trap but too strong to allow for focusing on the column. The absence of reserpine and ranitidine in the chromatogram indicate their lack of elution from the trap column. The mobile phase was not strong enough to desorb these analytes from the trap column and carry them to the chromatographic column.

Figure 4A:
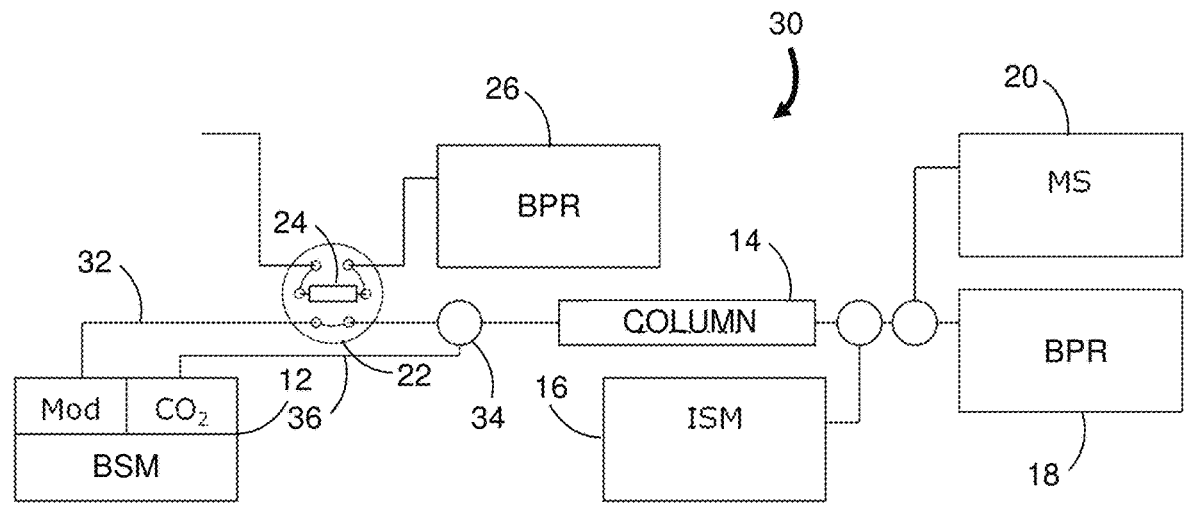
FIG. 4A is a block diagram of an embodiment of a carbon dioxide-based CFC system for performing a chromatographic separation and having a valve configured in a first state.
Figure 4B:
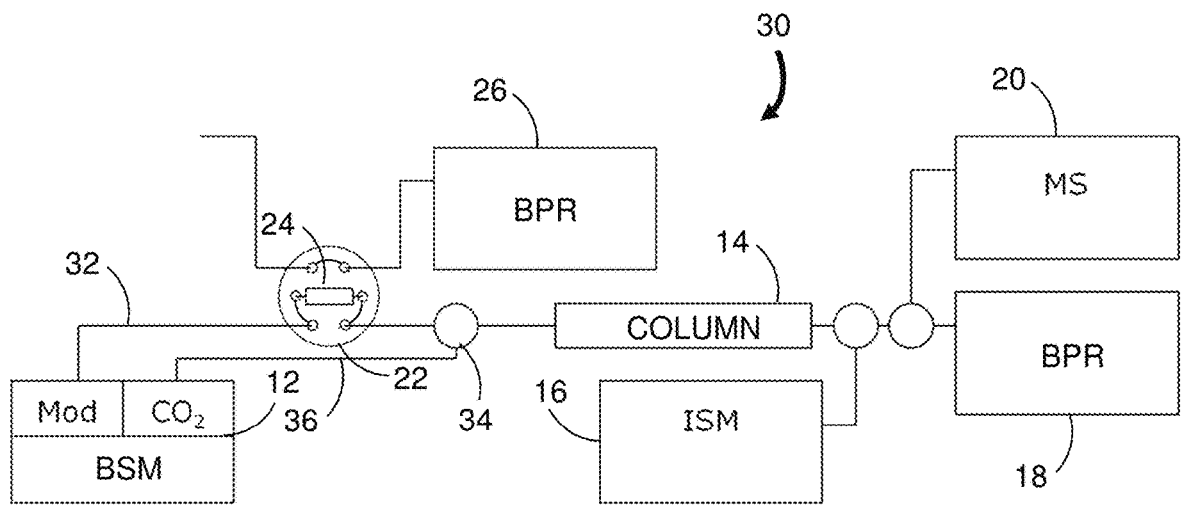
FIG. 4B is a block diagram of the carbon dioxide-based CFC system of FIG. 4A with the valve configured in a second state.

FIG. 4A and FIG. 4B are block diagrams of an embodiment of a carbon dioxide-based system 30 for performing a secondary chromatographic separation with the valve 22 in a first state and a second state, respectively. The system 30 includes components similar to those described above with respect to FIG. 2A; however, the fluid flow paths from the mobile phase pump 12 are configured differently. Instead of providing a secondary dimension mobile phase as a mixture of the carbon dioxide and modifier to the valve 22, the modifier is independently provided to the valve 22 through a first flow path 32 and the carbon dioxide is provided to a mixer or flow combiner 34 (e.g., a fluidic tee) through a second flow path 36 where the carbon dioxide flow is merged with the flow of the modifier from the valve 22.

Configuration of the valve 22 in the second state allows the modifier to flow to the trap column 24. The high elution strength of the modifier enables the analytes on the trap column 24 to be desorbed while the downstream addition of the carbon dioxide at the flow combiner 34 reduces the elution strength of the fluid flow. The lower elution strength of the mixed mobile phase allows for efficient refocusing of the analytes onto the secondary dimension chromatographic column 14.

Figure 5:
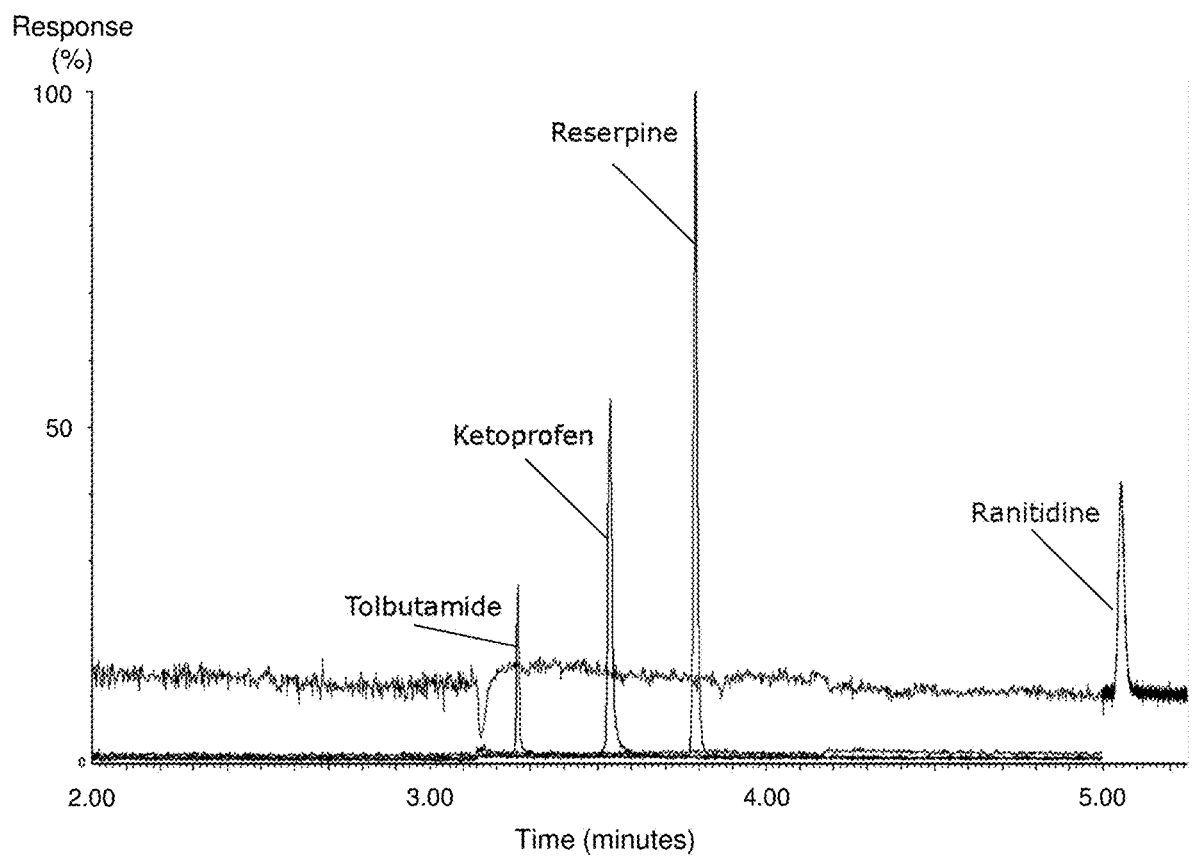
FIG. 5 is an example of a chromatogram generated with the carbon dioxide-based system of FIGS. 4A and 4B.

FIG. 5 shows a chromatogram generated with the carbon dioxide-based system 30 of FIGS. 4A and 4B under conditions similar to those described above with respect to FIG. 3. The modifier elution effectively desorbs all analytes from the trap column. It can readily be seen that introducing the carbon dioxide downstream from the valve 22 and trap column 24 results in substantially sharper peaks in the chromatogram. The peak retention times are not the same for the two chromatograms as the rates of elution from the trap column 24 are different as well as differences due to the focusing at the chromatographic column 14.

Figure 6:
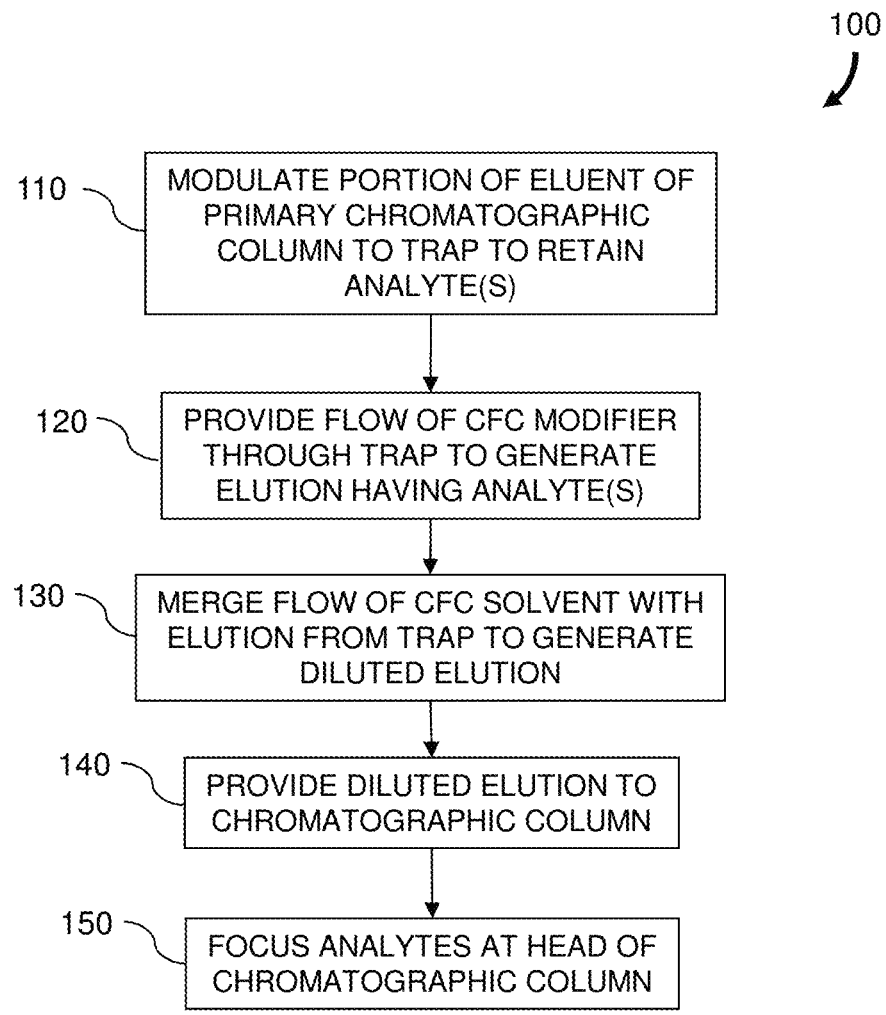
FIG. 6 is a flowchart representation of an embodiment of a method of performing a chromatographic separation.

FIG. 6 is a flowchart representation of an embodiment of a method 100 of performing a chromatographic separation. An eluent from a separation performed on a primary chromatography system is modulated (step 110) so that at least a portion of the eluent is provided to a trap column that retains one or more analytes. Subsequently, a flow of a modifier for a CFC mobile phase is provided (step 120) to the trap column. As a result, the elution from the trap column includes the analytes. A flow of a CFC solvent is merged (step 130) with the elution to generate a diluted elution which is provided (step 140) to a chromatographic column where the analytes are focused (step 150) at the head of the column. The flow rates of the CFC modifier and CFC solvent preferably are maintained constant over a period of time sufficient for the analytes on the trap column 24 to elute and to be refocused at the head of the chromatographic column 14. Subsequently, the flow rates may be controlled to achieve a desired gradient mobile phase for the secondary separation.

The method 100 may be performed using the carbon dioxide-based system 30 of FIGS. 4A and 4B; however, it should be recognized that other chromatography systems can be used to practice the method 100, including systems having different components and/or flow paths.

Although the method 100 and chromatography system 30 described above relate to use of a modulator, as implemented in the valve 22 and trap column 24, to select and provide a single "heart-cut" portion of an eluent of a primary chromatographic dimension, in another embodiment a valve is configured with two (or more) trap columns and operated so that the eluent of a primary chromatographic separation is alternatingly provided to the two traps. This configuration and operation allows a series of consecutive heart-cut portions from the eluent of a primary chromatography system (e.g., a liquid chromatography system or a CFC system) to be trapped and subsequently provided to the secondary chromatographic column. In this manner a comprehensive separation can be performed on most or all of the eluent from the primary chromatographic separation.

In another embodiment, the trap column 24 is advantageously used to concentrate a volume sample, that is, a large volume of a solution having an analyte. By way of example, the volume sample may be generated in a process that does not require a primary separation and may have a volume that is substantially greater than that which is typically provided with the analyte from a chromatographic separation. Without concentration, introduction of the volume sample into a chromatography system would yield poor results (e.g., breakthrough peak profiles) as the volume sample solvent prevents focusing at the chromatographic column 14. Although the flow at the column 14 can be diluted to prevent breakthrough of the chromatographic peaks, the time to inject the sample into the system flow increases accordingly and may be excessive.

In another embodiment, a CFC extraction system or a pressurized liquid extraction system is used in place of the chromatography system 30. Analytes of interest are dissolved from a solid matrix or liquid matrix (including viscous liquids such as gels or resins) and trapped on the trap column 24. By way of non-limiting examples, the solid matrix may be soil, plant compounds, pharmaceutical pills, or a sorbent bed. The solid matrix extraction processes may require significant time for dissolution of the analytes and the trap column 24 enables these analytes to be concentrated before focusing the analytes onto the chromatographic column 14.

Figure 7A:
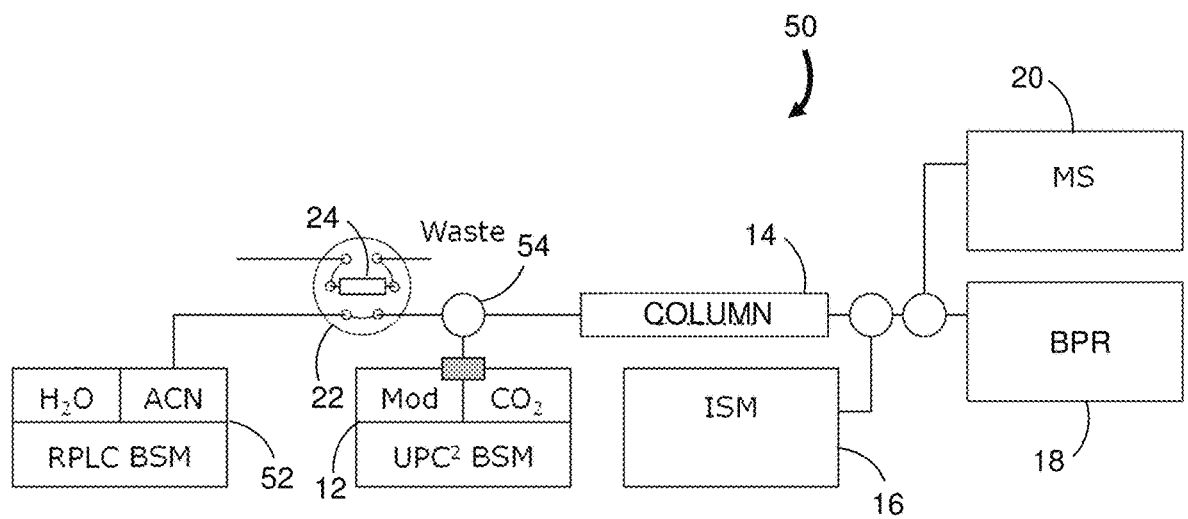
FIG. 7A is a block diagram of another embodiment of a carbon dioxide-based CFC system for performing a chromatographic separation and having a valve configured in a first state.

Referring to the block diagram of FIG. 7A, a carbon dioxide-based system 50 for performing a secondary chromatographic separation is shown. The system 50 includes components similar to those depicted in FIG. 4A as indicated by similar reference numbers. The valve 22 is configured to receive a portion of an eluent from a reverse phase liquid chromatography (RPLC) system. The RPLC system is used to perform a primary chromatographic separation. The RPLC system includes a pump 52 that contributes a strong RPLC solvent for the trap elution. The components of the primary RPLC system are not shown. In one embodiment the trap elution solvent is acetonitrile and in another embodiment the trap elution solvent is heptane. The valve 22 and the trap column 24 are used to modulate the primary dimension separation onto the secondary dimension chromatographic column 14.

Figure 7B:
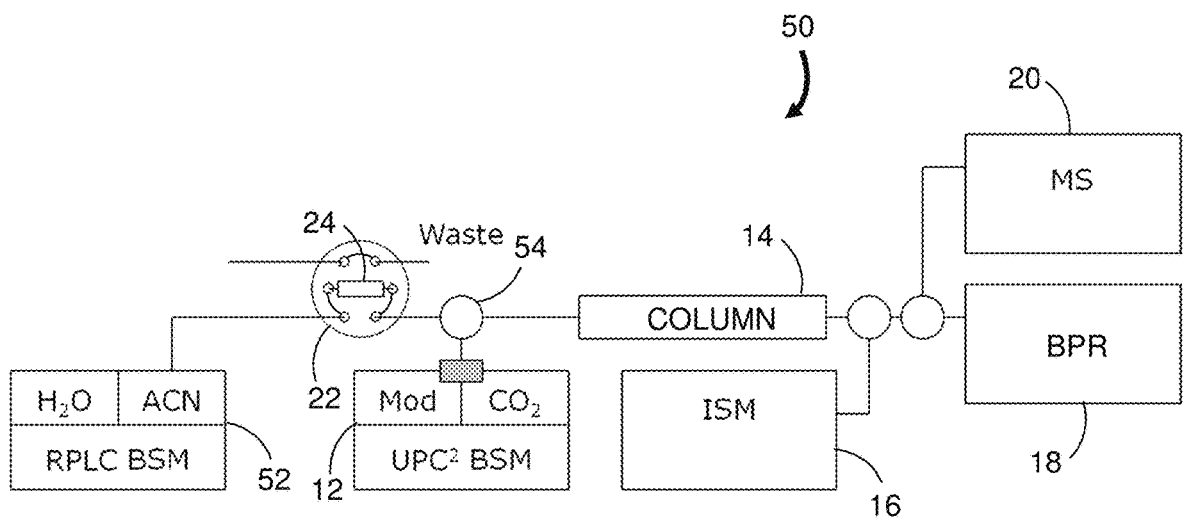
FIG. 7B is a block diagram of the carbon dioxide-based CFC system of FIG. 7A with the valve configured in a second state.

Once the analytes are loaded onto the trap column 24, the valve 22 is switched to a second state, as shown in FIG. 7B, so that a trap elution solvent, sourced from the trap elution pump 52, flows through the trap column 24 and merges with the mobile phase from the mobile phase pump 12 of the second chromatography system 50 at a mixer or flow combiner 54. In this way, the trap elution solvent is diluted by the mobile phase so that then net elution power is reduced to enable refocusing onto the secondary chromatographic column 14. Advantageously, since carbon dioxide-based CFC is a normal phase-like technique, a solvent in the RPLC system which has a strong elution power has substantially weaker elution power in a CFC system. In addition, the trap elution solvent is effectively diluted with the carbon dioxide mobile phase, resulting in a low net mobile phase elution strength for the secondary dimension separation. Thus the analytes eluted from the trap column 24 are efficiently refocused on the secondary chromatographic column 14 and enable secondary chromatograms with sharper peaks to be obtained. Preferably, the carbon dioxide mobile phase composition is pure or near-pure carbon dioxide during the time when the analytes are refocused on the column 14. A gradient mobile phase containing an increasing contribution of a modifier can be started after sufficient time to ensure the analytes are refocused on the column 14. The flow of the trap elution solvent may be terminated after refocusing is complete; however, in some embodiments, the flow of the trap elution solvent is maintained at a nominal low flow rate during the secondary separation if the trap elution solvent is known not to have a negative effect on the secondary separation.

Figure 8:
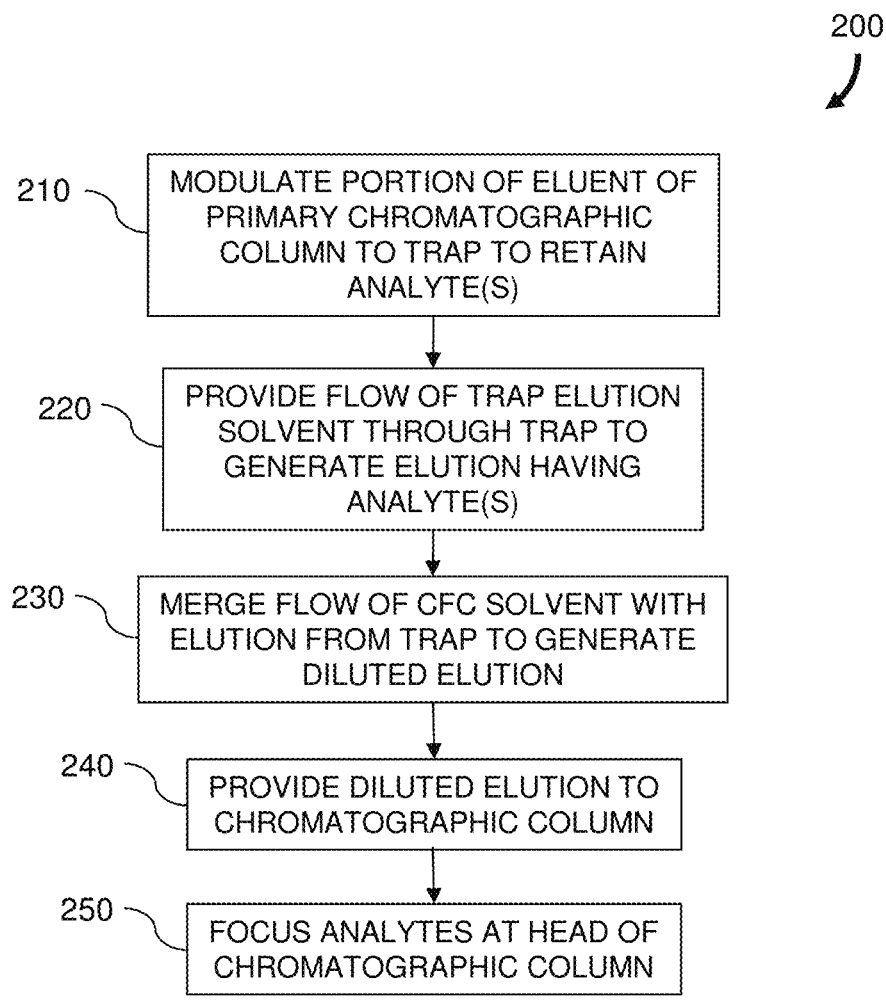
FIG. 8 is a flowchart representation of another embodiment of a method of performing a chromatographic separation.

FIG. 8 is a flowchart representation of another embodiment of a method 200 of performing a chromatographic separation. An eluent from a primary separation is modulated (step 210) so that at least a portion of the eluent is provided to a trap column that retains one or more analytes. Subsequently, a flow of a trap elution solvent is provided (step 220) to the trap column. As a result, the elution from the trap column includes the analytes previously retained on the trap column. A flow of a CFC solvent is merged (step 230) with the elution to generate a diluted elution which is provided (step 240) to a chromatographic column where the analytes are focused (step 250) at the head of the column. The flow rates of the trap elution solvent and the near-supercritical or supercritical solvent preferably are maintained constant over a period of time sufficient for the analytes on the trap column 24 to elute and be refocused on the chromatographic column 14. Subsequently, the flow rates may be altered to achieve a gradient mobile phase for the secondary separation.

The method 200 may be performed using the carbon dioxide-based system 50 of FIGS. 7A and 7B; however, it should be recognized that other chromatography systems and extraction systems can be used to practice the method 200, including systems having different components and/or flow paths.

Figure 9A:
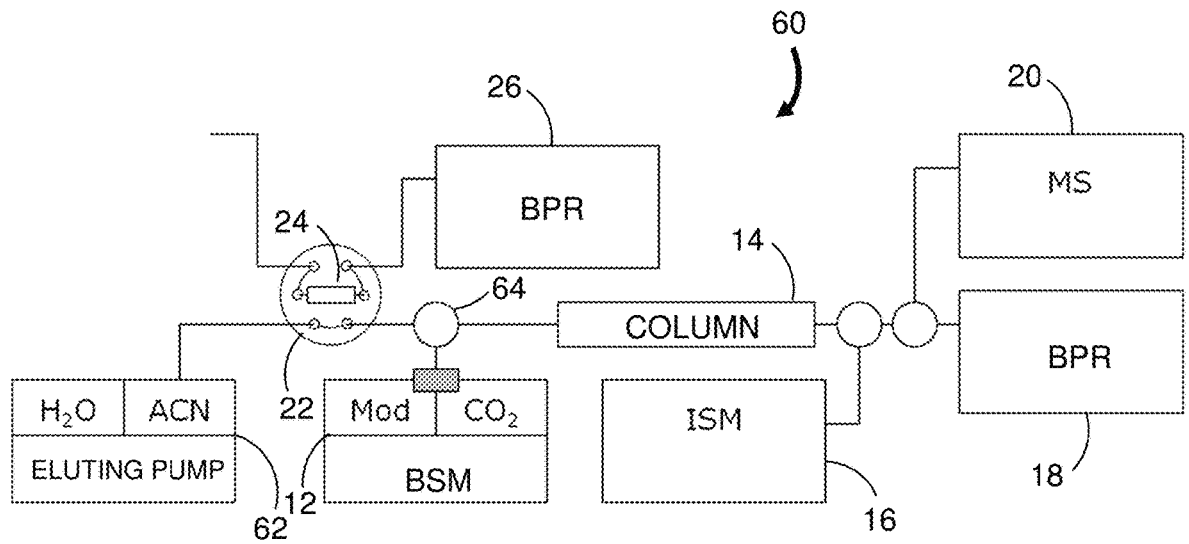
FIG. 9A is a block diagram of another embodiment of a carbon-dioxide-based CFC system for performing a chromatographic separation and having a valve configured in a first state.
Figure 9B:
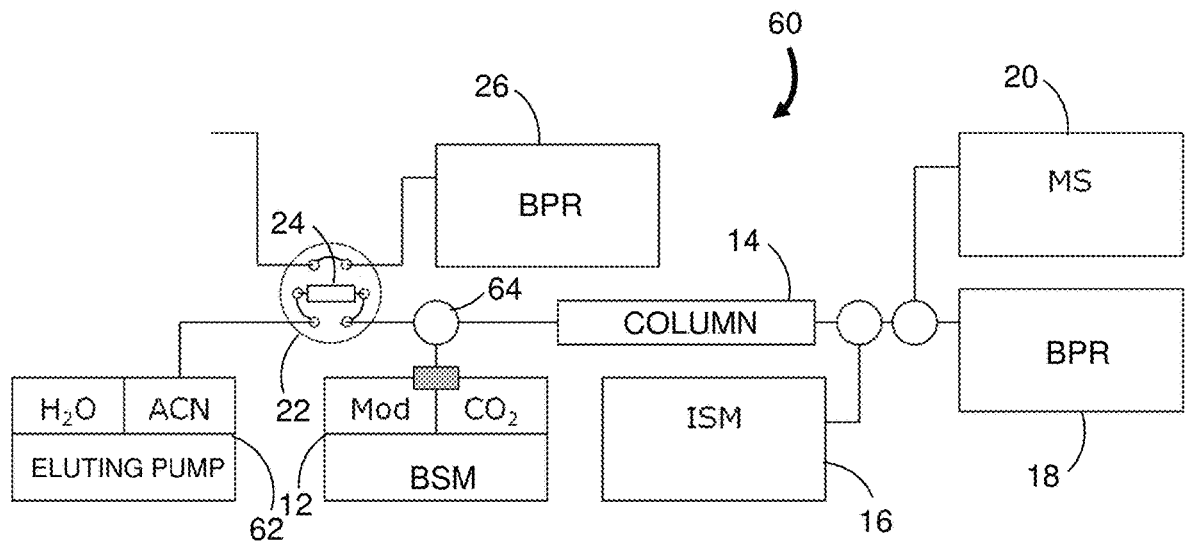
FIG. 9B is a block diagram of the carbon dioxide-based CFC system of FIG. 9A with the valve configured in a second state.

The chromatography system 50 described above is used in conjunction with a RPLC system for the primary dimension. Alternatively, a carbon dioxide-based system may be used for the primary dimension and a second carbon dioxide-based system for the secondary dimension. An example of a secondary chromatography system 60 for this purpose is shown in FIG. 9A. The system 60 includes a separate elution pump 62 coupled to a source of water and/or an organic solvent (e.g., acetonitrile) to enable a flow of one or both solvents to the valve 22. The valve 22 is shown in a first state in which the trap column 24 is loaded using the primary dimension mobile phase. The valve 22 is subsequently switched to a second state, as shown in FIG. 9B, so that the organic solvent provided by the elution pump 62 flows to the trap column 24 to elute the trapped analytes. The trap elution is merged with the secondary dimension mobile phase at a flow combiner 64. The mobile phase dilutes the organic solvent so that the net elution strength of the mobile phase is sufficiently low as to enable refocusing of the analytes from the trap column 24 onto the secondary dimension chromatographic column 14.

Figure 10:
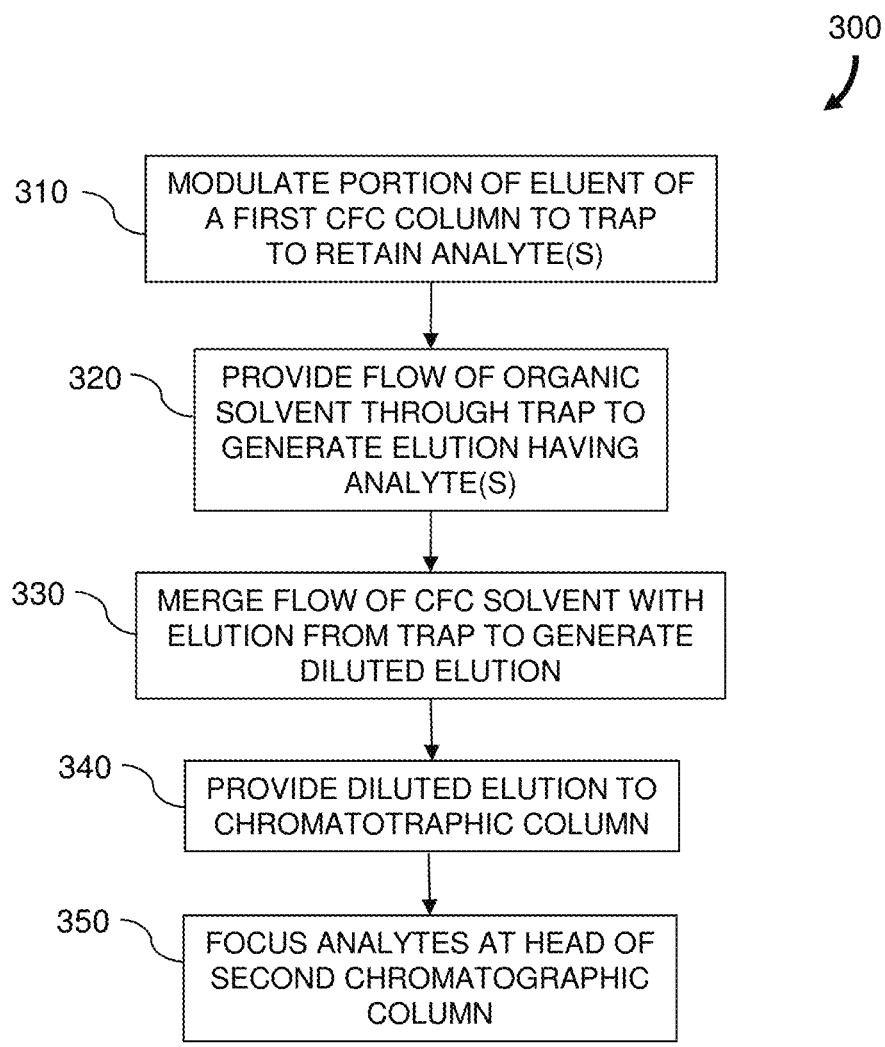
FIG. 10 is a flowchart representation of another embodiment of a method of performing a chromatographic separation.

FIG. 10 is a flowchart representation of an embodiment of a method 300 of performing a chromatographic separation. An eluent from a CFC primary separation is modulated (step 310) so that at least a portion of the eluent is provided to a trap column that retains one or more analytes. Subsequently, a flow of an organic solvent is provided (step 320) to the trap column. As a result, the elution from the trap column includes the analytes previously retained on the trap column. A flow of a CFC mobile phase is merged (step 330) with the elution to generate a diluted elution which is provided (step 340) to a second CFC column where the analytes are focused (step 350) at the head of the second column. The flow rates of the organic solvent and the CFC mobile phase preferably are maintained constant over a period of time sufficient for the analytes on the trap column 24 to elute and be refocused on the chromatographic column 14. Subsequently, the flow rates may be altered to achieve a gradient mobile phase for the secondary separation.

In various embodiments described above, the flows of various fluids are controlled. It will be recognized that in other embodiments the temperature of the trap column, the temperature of the secondary chromatographic column and/or the pressure of the fluids may be controlled to improve the retention and/or elution of analytes on the trap column and secondary column.

While the invention has been shown and described with reference to specific preferred embodiments, it should be understood by those skilled in the art that various changes in form and detail may be made therein without departing from the scope of the invention as defined by the following claims.

The invention claimed is:

1. A method of performing a chromatographic separation, the method comprising:
   modulating a portion of a flowstream to a trap column to thereby retain at least one analyte from the flowstream on the trap column;
   providing a flow of a solvent through the trap column to thereby generate an elution comprising the at least one analyte, the solvent being only one of at least two different solvents mixed to form a compressible fluid based chromatography (CFC) solvent;
   merging a flow of the CFC solvent with the elution from the trap column to generate a diluted elution; and
   providing the diluted elution to a CFC column, wherein the at least one analyte is focused at a head of the CFC column.

2. The method of claim 1 wherein the flowstream comprises an eluent from a chromatography system.

3. The method of claim 1 wherein the merging of the flow of the CFC solvent with the elution from the trap column comprises merging a flow of carbon dioxide with the elution from the trap column.

4. The method of claim 1 wherein the CFC solvent is a CFC mobile phase.

5. The method of claim 4 wherein the CFC mobile phase comprises carbon dioxide.

6. The method of claim 5 wherein the CFC mobile phase further comprises a modifier.

* * * * *